United States Patent Office 3,525,923
Patented Aug. 25, 1970

3,525,923
CONVERTER WITH SINGLE QUENCHING
Arne Jensen, Havnbjerg, and Tom Kastrup Petersen, Nordborg, Denmark, assignors to Danfoss A/S, Nordborg, Denmark, a company of Denmark
Filed Aug. 28, 1968, Ser. No. 755,877
Claims priority, application Germany, Aug. 29, 1967, D 53,956
Int. Cl. H02m 7/44
U.S. Cl. 321—45                4 Claims

ABSTRACT OF THE DISCLOSURE

In a converter with single quenching, a pair of load rectifiers connected to opposite ends of an output choke each has a quenching rectifier and associated commutation capacitor. A resistor is connected from each load rectifier to the opposing quenching capacitor to insure that the capacitor is charged enough to quench its own load rectifier.

---

Figure 1:
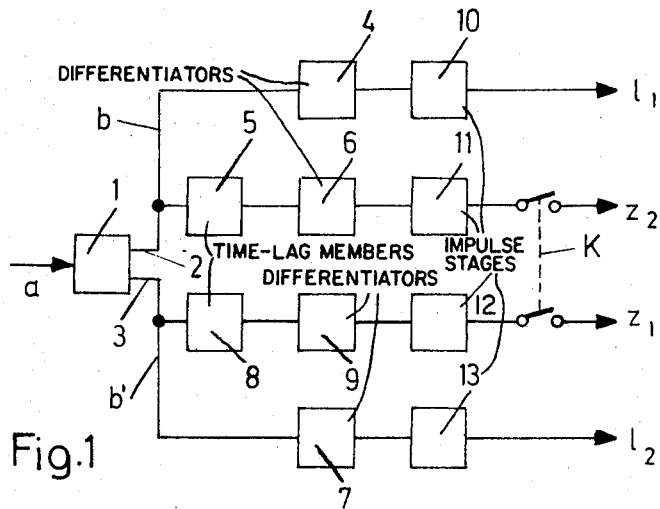

This invention relates to a converter with single quenching, wherein a first controlled load rectifier, a first blocking rectifier, a swinging choke, to the central tap of which the load is connected, a second blocking rectifier and a second controlled load rectifier are connected in series in the same direction and a commutation circuit is arranged in parallel with each load rectifier. The commutation circuit consists of a commutation condenser and a controlled quenching rectifier connected in series, and of a series connected swinging choke and diode, bridging the quenching rectifier.

Converters are known in which, when a quenching rectifier fires, a commutating condenser is discharged by way of a load rectifier, suppressing the holding current and thus extinguishing the load rectifier. When the load rectifier fires again, the commutation condenser can be charged in the opposite direction through a swinging choke and diode of its commutation circuit, so that it is available again for a fresh quenching operation. Here, however, difficulties arise in charging the condenser for the first time and in covering its operational losses.

The object of the invention therefore is to provide a converter of the above-described kind wherein the commutation condensers can be fully charged in a simple manner.

According to the invention, this object is achieved by interconnecting the cathodes of the two load rectifiers as well as interconnecting their anodes by means of ohmic resistors. With the help of these ohmic resistors, the commutation circuits which at one end receive a direct-current voltage from the converter are also connected to its other voltage. Thus, when a quenching impulse opens the quenching rectifier, the associated commutation condenser is charged through the ohmic resistor. Recharging also takes place in a similar manner during operation in order to cover the condenser losses.

The resistance of these resistors should, of course, be so high that, in normal operation, they cause no troublesome losses. These resistors can, however, be as large as required if, for loading the commutation condensers, provision is made for a few quenching impulses to be transmitted first and then quenching and firing impulses. Even if the charging of the condensers should extend over several cycles of the control voltage, the sequence ensures that the condensers are fully charged when the first firing impulses occur.

Nor do large ohmic resistors cause trouble as regards recharging during operation if provision is made for the control impulses of the first load rectifier to lag behind those of the second quenching rectifier or the control impulses of the second load rectifier to lag behind those of the first quenching rectifier, but still having the respective impulses overlap. By this system, a recharging current for the condenser flows during the overlapping period, through the two blocking rectifiers and the swinging choke of the system by way of the respective other load rectifiers. Since currents of any required strength can be passed over this path, the recharging of the condenser is completed very rapidly. A recharging current through the ohmic resistors can therefore be very small.

The ohmic resistors solve a further problem. If a converter operates on a pronouncedly inductive load, the current in the load continues to flow even if the associated load rectifier is already blocked. In this connection it is known to employ free-running diodes which enable the current to continue to flow. If, however, the other load rectifier is fired immediately thereafter, no holding current flows through it so that it can be blocked again after the firing impulse has been quenched. If the ohmic resistors are so rated that they pass the holding current to the load rectifiers, this ensures, on the other hand, that the load rectifiers are kept open until the current in the load has changed its direction and then flows normally through the load rectifier.

Figure 2:
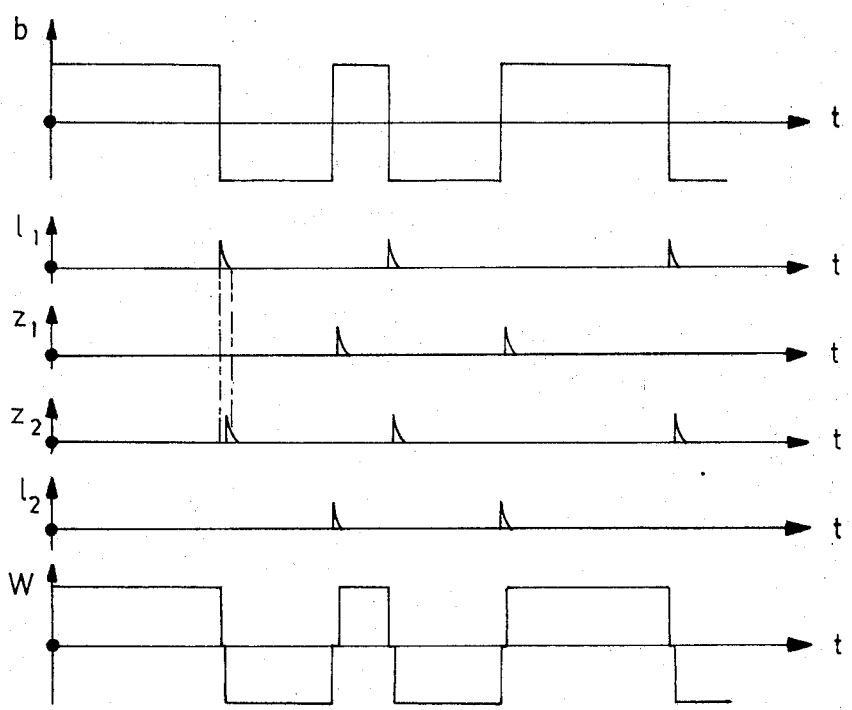
Figure 3:
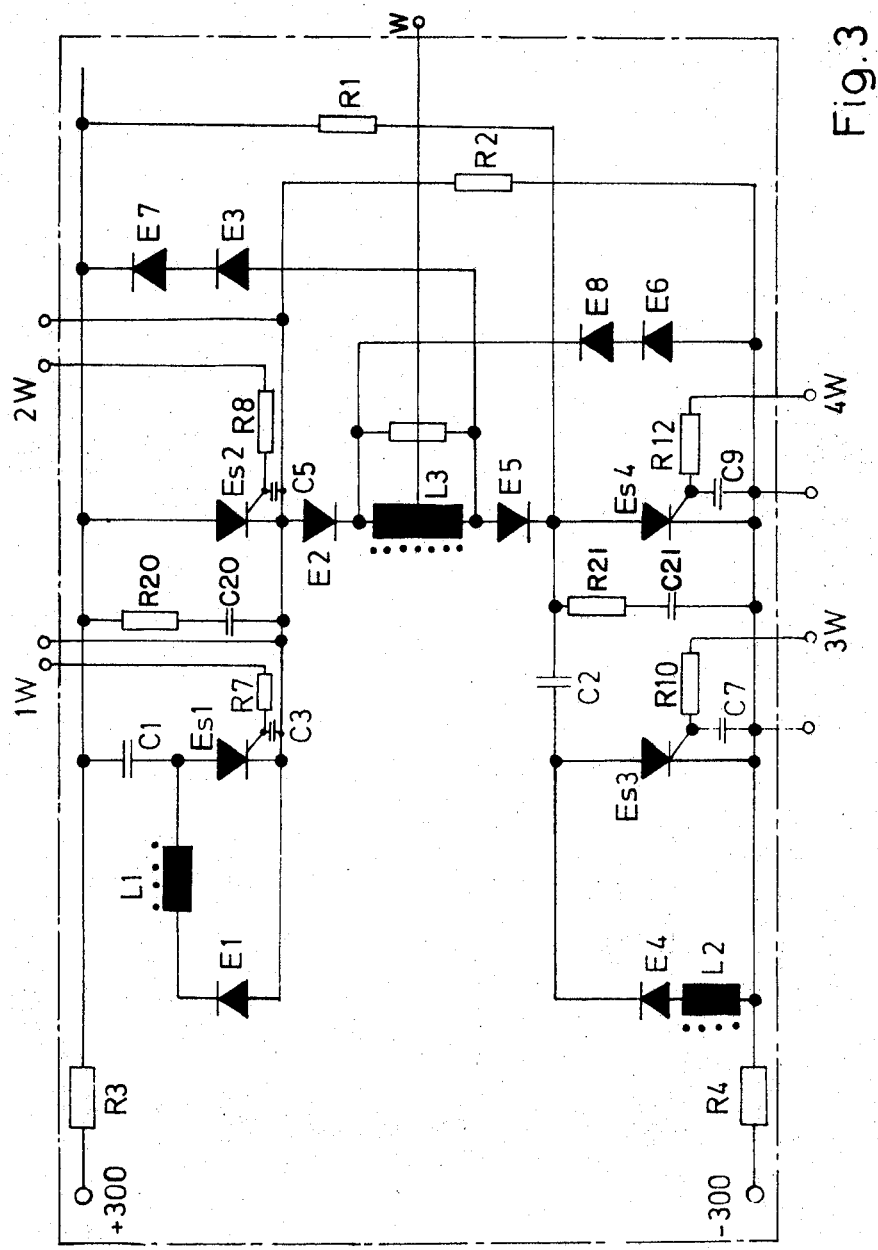

The invention will now be described in more detail by reference to the drawing, wherein:

FIG. 1 is a schematic block diagram of an impulse generator for operating the converter, FIG. 2 is a diagram showing the sequence of the signals occurring in connection with the invention and, FIG. 3 is a circuit diagram of the converter according to the invention.

FIG. 1 shows that an input signal is fed to a null detector 1, whereby at least the passages through zero correspond to the required voltage at the load. The null detector has two output points 2 and 3. A first branch runs from the output point 2 to the differentiator 4, and a second branch runs to a differentiator 6 by way of a time-lag member 5. From the output point 3 a first branch runs to a differentiator 7 and a second branch to a differentiator 9 by way of a time-lag member 8. Impulse stages 10–13, preferably in the form of any impulse transformers, are associated respectively with each differentiator. The quenching impulses $l_1$ and $l_2$ as well as the firing impulses $z_1$ and $z_2$ can be received from these impulse stages. The quenching impulses are sent immediately upon switching on the equipment and the firing impulses are only sent after a switch K has been operated, so that at first only quenching impulses are generated and after that, firing and quenching impulses. Complete circuit details of FIG. 1 may be found in my copending application Ser. No. 755,878, filed on Aug. 28, 1968.

In the first line of FIG. 2 is shown the signal $b$ which is taken from the output point 2 of the null detector 1. The signal $b'$ at the output point 3 is of the same form but of opposite phase. It can be clearly seen that the system generates the impulses $l_1$, $z_1$, $z_2$, and $l_2$. The firing impulses follow each associated quenching impulse at a short distance, but in such manner that they still overlap as shown by lines 2–5 of FIG. 2. In this way a voltage W as seen in the sixth line of this figure can be produced in the heavy current part. By way of example, the impulses have a total duration of 30 to 40 micro-sec. and overlap to the extent of about 10 micro-sec.

In the heavy current part of the circuit shown in FIG. 3, a positive and a negative voltage of 300 v. each are available for feeding the phase W. The main current path runs on the one hand from the positive pole of the voltage source by way of a resistor R3, a controllable load rectifier E$s$2, a blocking rectifier E2 and the first half of a swinging choke L3, to the output terminal W. In the next half-wave, the current flows from the terminal W by way of the second half of the swinging choke 3, a blocking rectifier E5, a second load rectifier Es4 and a resistor R4 to the negative pole of the voltage source. Associated with the load rectifier Es2 is a commutation circuit which is formed by a quenching rectifier Es1 in series with a condenser C1 and bridged by the connection in series of a diode E1 and a swinging choke L1. The load rectifier Es4 likewise has a commutation circuit which consists of a quenching rectifier Es3 in series with a condenser C2 and bridged by the connection in series of a rectifier E4 and a swinging choke L2. The firing and quenching impulses for the various rectifiers Es1, Es2, Es3, and Es4 are applied to the terminals 1W, 2W, 3W and 4W respectively. The impulses are here passed through a resistor and a condenser connected in series, R7–C3, R8–C5, R10–C7 and R12–C9 respectively.

The load rectifier Es2, the blocking rectifier E2 and the swinging choke are bridged by oppositely connected free-running diodes E3 and E7. Similarly the swinging choke L3, the blocking rectifier E5 and the load rectifier Es4 are bridged by the oppositely connected free running diodes E6 and E8. A resistor R1 is also present which connects the anodes of the two load rectifiers Es2 and Es4, and a resistor R2 connects the cathodes of these two load rectifiers. A resistor R20 and capacitor C20 are series connected with each other and are in turn connected in parallel with rectifier Es2. Likewise, a resistor R21 and capacitor C21 are series connected with each other and are in turn connected in parallel with rectifier Es4.

When the main switch is closed and with switch K open only quenching impulses are sent at first. When the quenching impulse $l_1$ is sent, the commutation condenser C1 is charged by way of the associated quenching rectifier Es1 and the resistor R2. When the quenching impulse $l_2$ is sent, the commutation condenser C2 is charged by way of the resistor R1 and the associated quenching rectifier Es3. If the switch K is now closed, a firing impulse immediately follows a quenching impulse. When the firing impulse $z_1$ occurs, a load flows from the positive terminal of the voltage source to the terminal W by way of the load rectifier Es2, the blocking rectifier E2 and the swinging choke L3. At the same time, the condenser C1 is recharged by a current flowing through the load rectifier Es2, the diode E1 and the swinging choke L1. Furthermore, recharging of the condenser C2 can take place since a current can flow from the swinging choke L3 by way of the blocking rectifier E5 as long as the quenching rectifier Es3 still remains open due to the quenching impulse and firing impulse overlapping.

The load rectifier Es2 remains open as long as at least a holding current is flowing through it. If a quenching impulse $l_1$ is passed to the quenching rectifier Es1, the condenser C1 discharges by way of the load rectifier Es2, so that the latter is quenched for lack of holding current. Immediately thereafter, the load rectifier Es4 is fired and the interplay continues with the negative half-wave of the load current. Here too, the condenser C2 is recharged by way of the associated load rectifier, the swinging choke L2 and the diode E4. The condenser C1 can also be recharged because of the overlapping of the firing and quenching impulses, so that it is again available for the next swinging operation.

For the case where the load at the terminal W is inductive, current in the load continues to flow in the same direction even when the load rectifier Es2 is quenched, a negative voltage occurring at the terminal W, which voltage is lower than the voltage at the negative pole of the voltage source. Consequently, a current flows through the free-running diodes E6 and E8 until the current changse phase W.

The firing impulse at the load rectifier Es4 will have died out again well before this time. In the absence of holding current, therefore, this rectifier would be quenched again if a holding current, flowed under all conditions by way of the resistor R1, were not passed through the load rectifier Es4. The free-running diodes E3 and E7 as well as the resistor R2 operate in a similar manner when the load rectifier Es2 is fired.

The resistors R1 and R2 should be so rated that, on the one hand, the condensers C1 and C2 are charged after a small number of cycles, e.g. after 2 cycles, and on the other hand, no appreciable power is passed through these two resistors during normal operation. In the connection described, the resistances can be rated at 20 kilo-ohms. If the condensers C1 and C2 have a capacitance of 0.2 micro-farad, charging takes place in about 10 milliseconds.

What we claim and desire to be secured by Letters Patent is:

1. A converter having positive and negative input terminals adapted to be connected to positive and negative sides respectively of a direct current supply; a swinging choke having first and second end terminals and a center terminal adapted to be connected to a load; a first controlled load rectifier and a first blocking rectifier connected in series in the same direction between said positive terminal and said first end terminal of said swinging choke; a second blocking rectifier and a second controlled load rectifier connected in series between the second end terminal of said swinging choke and said negative terminal in the same direction as said first rectifiers, a commutating circuit connected in parallel with each of said load rectifiers, each said commutating circuit comprising a commutation condenser and a controlled quenching rectifier connected in series and a series connected swinging choke and a diode bridging said quenching rectifier; first connecting means comprising an ohmic resistor interconnecting the cathodes of said first and second load rectifiers, and second connecting means comprising an ohmic resistor interconnecting the anodes of said first and second load rectifiers.

2. A converter as in claim 1 further comprising means for first generating quenching pulses without firing pulses connected to said controlled quenching rectifiers, whereby said commutation condensers are charged.

3. A converter as in claim 2 further comprising means for generating firing pulses lagging and overlapping said quenching pulses connected to said load rectifiers.

4. A converter as in claim 1 wherein said ohmic resistors pass a holding current to said load rectifiers.

References Cited

UNITED STATES PATENTS

| | | | |
|---|---|---|---|
| 3,278,827 | 10/1966 | Corey et al. | 321—44 |
| 3,315,145 | 4/1967 | Menard | 321—44 |
| 3,340,457 | 9/1967 | Schmitz | 321—45 |
| 3,349,315 | 10/1967 | Studtmann | 321—45 |
| 3,355,654 | 11/1967 | Risberg | 321—44 |
| 3,384,804 | 5/1968 | Salihi | 321—5 |
| 3,405,346 | 10/1968 | Krauthamer | 321—45 |

WILLIAM M. SHOOP, JR., Primary Examiner